US012717306B2

(12) United States Patent
Gomi et al.

(10) Patent No.: US 12,717,306 B2
(45) Date of Patent: Aug. 25, 2026

(54) NUMERICAL CONTROL DEVICE WITH PREVENTION OF UNINTENDED AUTOMATIC RE-EXECUTION OF A MACHINING PROGRAM

(71) Applicant: Fanuc Corporation, Minamitsuru-gun (JP)

(72) Inventors: Shunichi Gomi, Minamitsuru-gun (JP); Kazuo Sato, Minamitsuru-gun (JP)

(73) Assignee: FANUC CORPORATION, Yamanashi (JP)

( * ) Notice: Subject to any disclaimer, the term of this patent is extended or adjusted under 35 U.S.C. 154(b) by 295 days.

(21) Appl. No.: 18/286,458

(22) PCT Filed: Apr. 21, 2021

(86) PCT No.: PCT/JP2021/016229
§ 371 (c)(1),
(2) Date: Oct. 11, 2023

(87) PCT Pub. No.: WO2022/224388
PCT Pub. Date: Oct. 27, 2022

(65) Prior Publication Data
US 2024/0201657 A1 Jun. 20, 2024

(51) Int. Cl.
*G05B 19/4155* (2006.01)

(52) U.S. Cl.
CPC .................... *G05B 19/4155* (2013.01); *G05B 2219/31372* (2013.01)

(58) Field of Classification Search
CPC .................................................. G05B 19/4155
See application file for complete search history.

(56) References Cited

U.S. PATENT DOCUMENTS

2001/0043799 A1* 11/2001 Okada .................. G11B 7/0037
2016/0026167 A1 1/2016 Yamada et al.
(Continued)

FOREIGN PATENT DOCUMENTS

CN 102193957 A 9/2011
CN 108107843 A 6/2018
(Continued)

OTHER PUBLICATIONS

International Search Report and Written Opinion for International Application No. PCT/JP2021/016229, dated Jul. 13, 2021, 8 pages.
(Continued)

*Primary Examiner* — Suresh Suryawanshi
(74) *Attorney, Agent, or Firm* — BUCHANAN INGERSOLL & ROONEY PC

(57) ABSTRACT

The present invention stores file identification information and edit dates and times for processing programs, stores file identification information for a program to be run that is a processing program that has been set to be run, recognizes the attachment of an external storage device, and, when the program to be run is stored at the attached external device, determines that the program to be run has been edited when the edit date and time of the program to be run as stored at the external storage device and the edit date and time of the program to be run as stored at a file information storage unit are different.

9 Claims, 6 Drawing Sheets

(56) References Cited

U.S. PATENT DOCUMENTS

| | | | | |
|---|---|---|---|---|
| 2018/0032404 | A1 | 2/2018 | Komatsu | |
| 2018/0150064 | A1 | 5/2018 | Ishigure | |
| 2019/0033830 | A1* | 1/2019 | Koyama | G05B 19/4155 |
| 2020/0254577 | A1 | 8/2020 | Iwamura | |
| 2021/0089006 | A1* | 3/2021 | Tatsuhiro | G05B 19/404 |

FOREIGN PATENT DOCUMENTS

| | | | | | |
|---|---|---|---|---|---|
| DE | 102016003898 | A1 | * | 10/2016 | G05B 19/4068 |
| JP | H07129208 | A | * | 5/1995 | |
| JP | H07-319531 | A | | 12/1995 | |
| JP | 08249038 | A | | 9/1996 | |
| JP | 1055209 | A | | 2/1998 | |
| JP | 2862051 | B2 | | 2/1999 | |
| JP | 2001350509 | A | | 12/2001 | |
| JP | 2004252853 | A | * | 9/2004 | |
| JP | 2010211467 | A | | 9/2010 | |
| JP | 2011191852 | A | | 9/2011 | |
| JP | 2017157172 | A | * | 9/2017 | G05B 19/4086 |
| JP | 2018018429 | A | | 2/2018 | |
| JP | 2018055211 | A | * | 4/2018 | |
| JP | 2020135045 | A | | 8/2020 | |

OTHER PUBLICATIONS

Office Action (The First Office Action) issued Mar. 10, 2026, by the State Intellectual Property Office of People's Republic of China in corresponding Chinese Patent Application No. 202180096985.0 and an English translation of the Office Action. (18 pages).

* cited by examiner

FIG.1
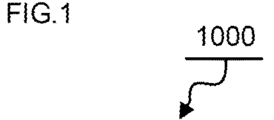
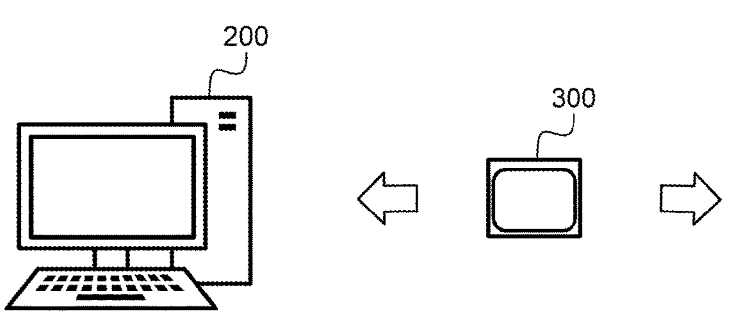
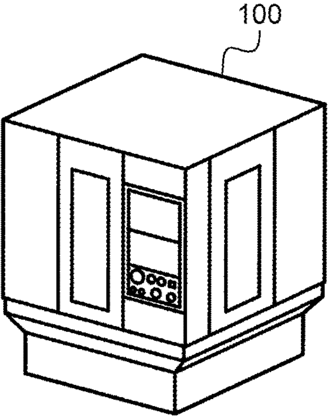

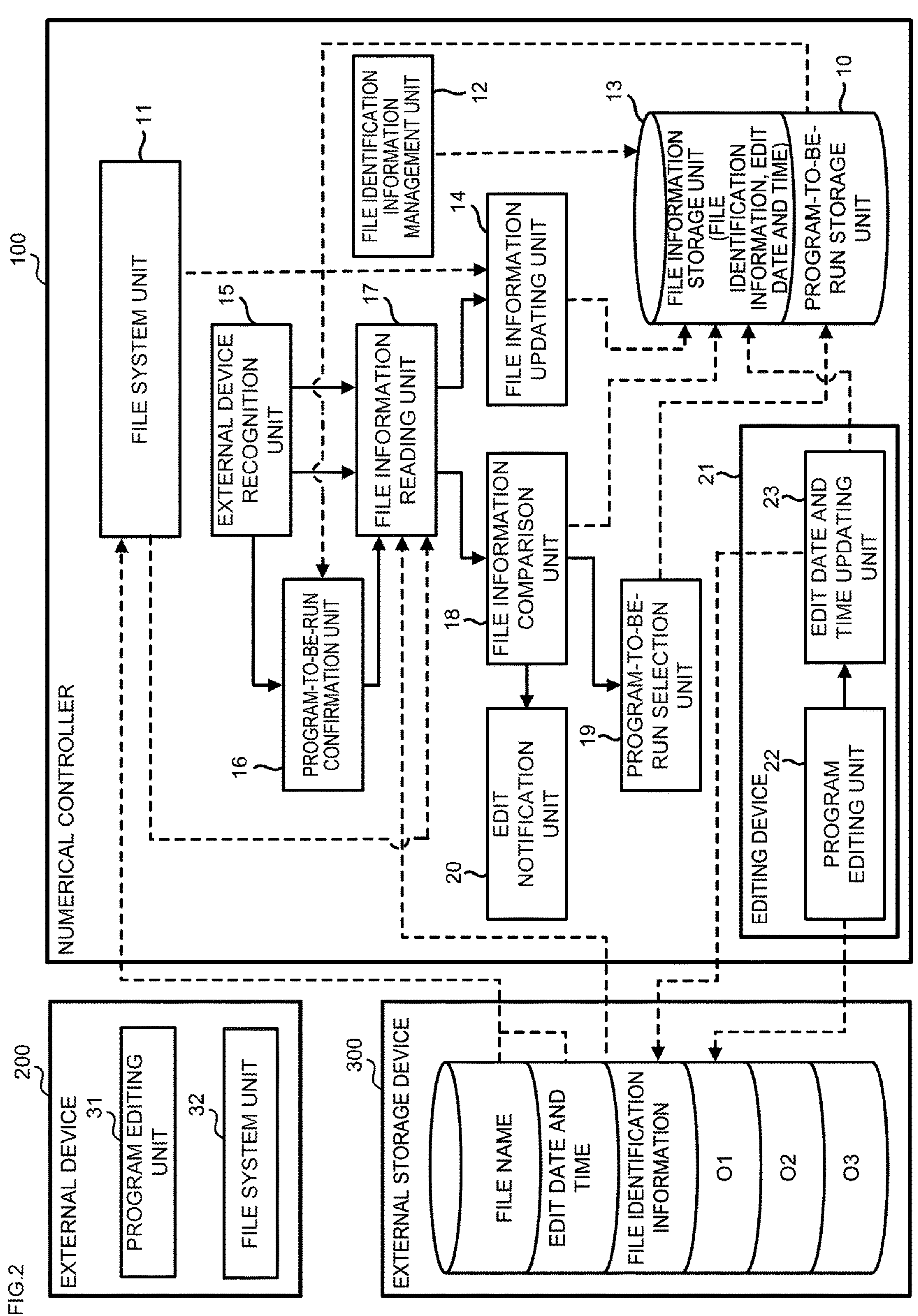
FIG.2
100
NUMERICAL CONTROLLER
FILE SYSTEM UNIT
11
EXTERNAL DEVICE RECOGNITION UNIT
15
PROGRAM-TO-BE-RUN CONFIRMATION UNIT
16
FILE INFORMATION READING UNIT
17
FILE IDENTIFICATION INFORMATION MANAGEMENT UNIT
12
FILE INFORMATION UPDATING UNIT
14
FILE INFORMATION COMPARISON UNIT
18
EDIT NOTIFICATION UNIT
20
PROGRAM-TO-BE-RUN SELECTION UNIT
19
FILE INFORMATION STORAGE UNIT (FILE IDENTIFICATION INFORMATION, EDIT DATE AND TIME)
13
PROGRAM-TO-BE-RUN STORAGE UNIT
10
EDITING DEVICE
21
PROGRAM EDITING UNIT
22
EDIT DATE AND TIME UPDATING UNIT
23
200
EXTERNAL DEVICE
PROGRAM EDITING UNIT
31
FILE SYSTEM UNIT
32
300
EXTERNAL STORAGE DEVICE
FILE NAME
EDIT DATE AND TIME
FILE IDENTIFICATION INFORMATION
O1
O2
O3

FIG.4

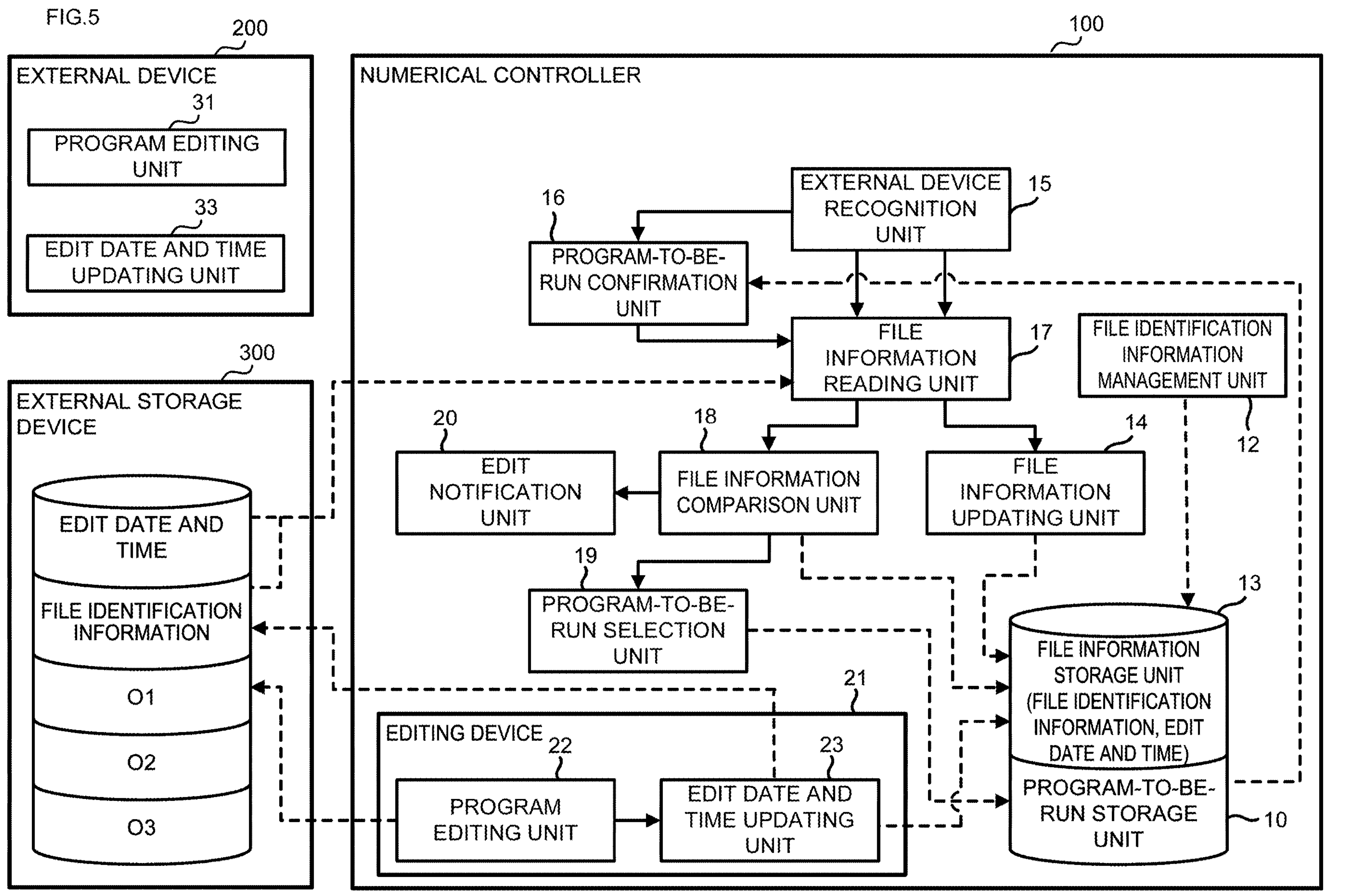
FIG.5
200
EXTERNAL DEVICE
31
PROGRAM EDITING UNIT
33
EDIT DATE AND TIME UPDATING UNIT
300
EXTERNAL STORAGE DEVICE
EDIT DATE AND TIME
FILE IDENTIFICATION INFORMATION
O1
O2
O3
100
NUMERICAL CONTROLLER
16
PROGRAM-TO-BE-RUN CONFIRMATION UNIT
EXTERNAL DEVICE RECOGNITION UNIT
15
FILE INFORMATION READING UNIT
17
FILE IDENTIFICATION INFORMATION MANAGEMENT UNIT
12
20
EDIT NOTIFICATION UNIT
18
FILE INFORMATION COMPARISON UNIT
14
FILE INFORMATION UPDATING UNIT
19
PROGRAM-TO-BE-RUN SELECTION UNIT
13
FILE INFORMATION STORAGE UNIT (FILE IDENTIFICATION INFORMATION, EDIT DATE AND TIME)
PROGRAM-TO-BE-RUN STORAGE UNIT
10
21
EDITING DEVICE
22
PROGRAM EDITING UNIT
23
EDIT DATE AND TIME UPDATING UNIT 100
NUMERICAL CONTROLLER
CPU
111
112
ROM
INT
118
113
RAM
INT
119
114
NUMERICAL CONTROLLER
CONTROLLER
40
DRIVER
41
DISPLAY UNIT
70
INPUT UNIT
71

NUMERICAL CONTROL DEVICE WITH PREVENTION OF UNINTENDED AUTOMATIC RE-EXECUTION OF A MACHINING PROGRAM

CROSS REFERENCE TO RELATED APPLICATIONS

This is the U.S. National Phase application of PCT/JP2021/016229, filed Apr. 21, 2021, the disclosure of this application being incorporated herein by reference in its entireties for all purposes.

FIELD OF THE INVENTION

The present invention relates to a numerical controller and a computer-readable storage medium.

BACKGROUND OF THE INVENTION

A program for a numerical controller can be edited by an external device, such as personal computer (PC) or server, in addition to the numerical controller itself. The program edited by the external device is stored in an external storage device, such as compact flash (CF: trademark) card.

Patent Literature 1 discloses that “A memory of a drive device 30 is a flash memory. A memory of a control unit 10 is a cassette system, and when updating s/w, a servo memory 103A containing transfer s/w and 30 pieces of s/w is installed to the control unit. When power is turned on in this state, s/w of the drive device 30 is updated automatically.”

PATENT LITERATURE

[Patent Literature 1] Japanese Patent No. 2862051

SUMMARY OF THE INVENTION

There is a numerical controller that has a function of selecting automatically a machining program which was used last time. Such numerical controller stores identification information about the machining program used last time. When power is turned on, for instance, the numerical controller automatically selects and reads the machining program used last time even if an operator does not select the machining program. In a case where the machining program is in a storage device of the numerical controller, the machining program is read from the numerical controller. In a case where the machining program is in an external storage device, the machining program is read from the external storage device. The operator simply turn on power or place the external storage device into the control device so as to continue the same processing.

However, the automatic selection of the machining program in the external storage device may cause unintended processing. The machining program in the external storage device may be modified by an external device, such as PC, and thus the operator may start processing without realizing the modification to the machining program.

In the field of numerical controller, there is a demand of a technology to determine whether or not a modification is made to file contents.

An aspect of the present invention is a numerical controller that includes a file information storage unit for storing file identification information and an edit date and time of a machining program, a program-to-be-run storage unit for storing file identification information about a program to be run which is a machining program set to be run, an external storage device recognition unit for recognizing an installation of an external storage device, and a file information comparison unit for determining that the program to be run is edited when there is a difference between an edit date and time of a program to be run stored in the external storage device and an edit date and time of a program to be run stored in the file information storage unit in a case where the program to be run is stored in the installed external storage device.

An aspect of the present invention is a computer-readable storage medium that is executed by one or more processors to perform: storing file identification information and an edit date and time of a machining program in a numerical controller; storing file identification information of a program to be run in the numerical controller, the program being a machining program set to be run; recognizing an installation of an external storage device to the numerical controller; and determining that the program to be run is edited when there is a difference between an edit date and time of a program to be run stored in the external storage device and an edit date and time of a program to be run stored in the numerical controller in a case where the program to be run is stored in the installed external storage device.

An aspect of the present invention is an editing device that associates a program editing unit for editing a machining program in a numerical controller and an edit date and time of the machining program, if the machining program is edited, with file identification information added to the machining program by the numerical controller, so as to store in the numerical controller.

One aspect of the invention enables a determination about whether or not a modification is made to file contents.

BRIEF DESCRIPTION OF THE DRAWINGS

FIG. 1 is a diagram of a file management system;

FIG. 2 is a block diagram of a file management system according to a first disclosure;

FIG. 4 is a flowchart illustrating a procedure of an update process for edit dates/times and a program to be run;

FIG. 5 is a block diagram of a file management system according to a second disclosure.

FIRST DISCLOSURE

Figure 3:
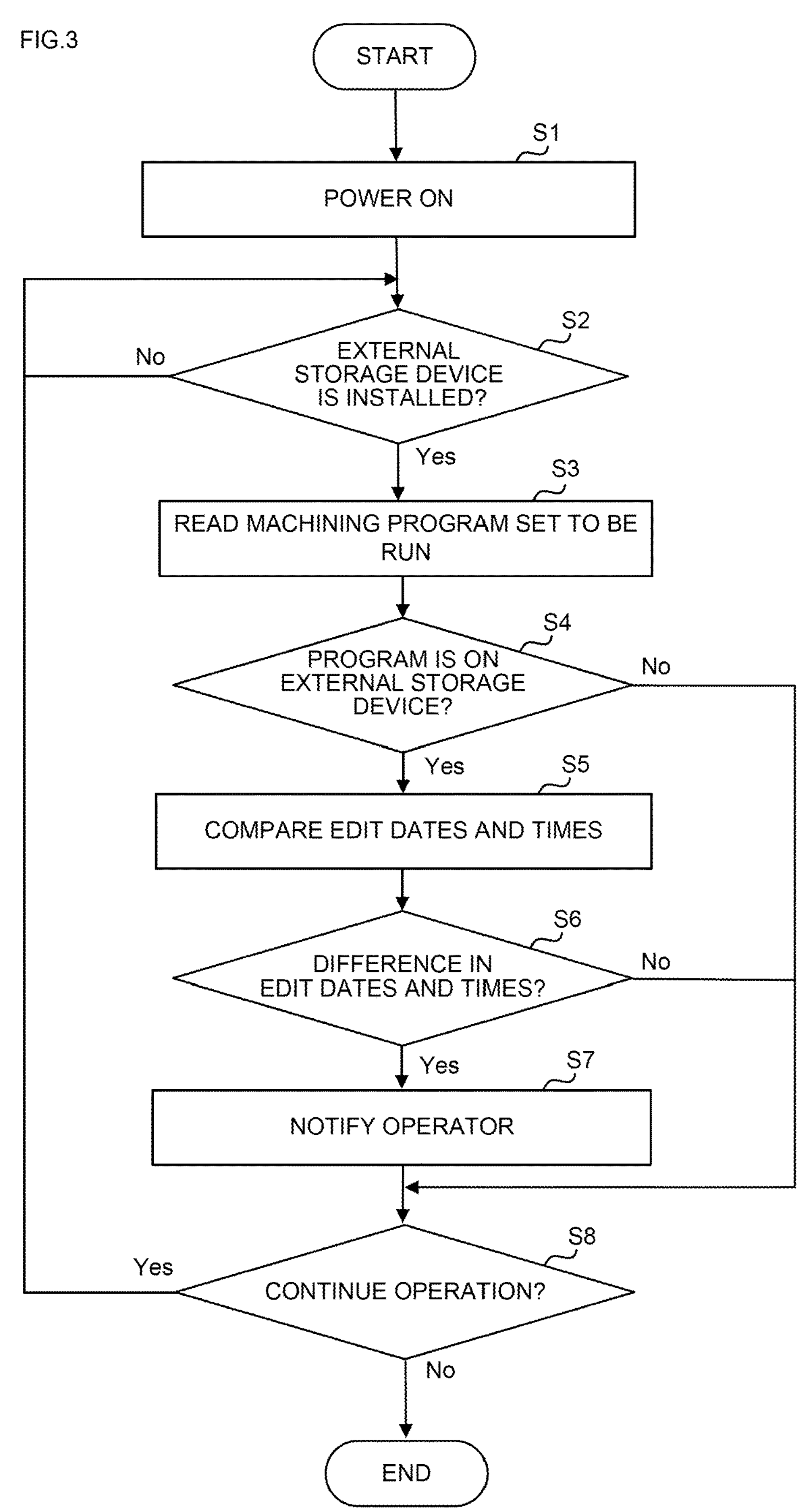
FIG. 3 is a flowchart illustrating a procedure of an edit determination process.

A description about a file management system according to a first disclosure will be made with reference to the accompanying drawings.

FIG. 1 is a diagram of a file management system 1000 according to the illustrative disclosure. The file management system 1000 of the disclosure includes a numerical controller 100 that controls a machine tool, and an external device that has a function of creating/editing a machining program. In the illustrative disclosure, an external device 200 will be described as a personal computer (PC), but is not limited to the PC as long as it is an information processing device having a program edit function. The numerical controller 100 and the external device 200 are provided with connectors to which an external storage device 300, such as a CF card, is installed. The external device 200 is configured to create/edit a machining program for the numerical controller 100 by the PC 200. The numerical controller 100 is configured to read the machining program edited by the PC 200.

FIG. 2 is a block diagram of the file management system 1000. The numerical controller 100 includes a program-to-be-run storage unit 10, a file system unit 11, a file identification information management unit 12, a file information storage unit 13, a file information updating unit 14, an external device recognition unit 15, a program-to-be-run confirmation unit 16, a file information reading unit 17, a file information comparison unit 18, a program-to-be-run selection unit 19, and an edit notification unit 20. Inside the numerical controller 100, an editing device 21 is mounted. The editing device 21 includes a program editing unit 22 and an edit date and time updating unit 23.

The file system unit 11 is a file allocation table (FAT) file system, for example, but is not limited thereto. The file system unit 11 manages files and directories of a read-only memory (ROM) and a random-access memory (RAM) of the numerical controller 100, about which will be described later, and files and directories of the external storage device 300.

When the installation of the external storage device 300 to the numerical controller 100 is recognized, the file system unit 11 reads management information about files recorded in the external storage device 300. The management information includes edit dates and times of the machining program.

The file identification information management unit 12 adds unique file identification information to an unknown machining program. The unknown machining program is a new program created by the numerical controller 100, or a machining program newly obtained via a network or the external storage device 300, by way of example. The file identification information management unit 12 stores the file identification information and an edit date and time of the file in the file information storage unit 13.

The file identification information is a unique value which is different from a file name managed by the file system unit 11. A file name managed by the file system unit 11 is given to each machining program by a programmer, and thus such names may overlap between the files. The file identification information added to the machining program by the file identification information management unit 12 does not overlap with another machining program because such information is unique to each file of the machining program.

The editing device 21 accepts machining program editing. The program editing unit 22 displays a screen of the machining program editing, so as to accept edit instructions from an operator. After the machining program editing is completed, the file system unit 11 updates edit date and time on the external storage device 300, and the edit date and time updating unit 23 updates edit date and time on the file information storage unit 13.

In a case where the machining program is edited by the editing device 21 of the numerical controller 100, both of the edit date and time on the file information storage unit 13 and the edit date and time on the external storage device 300 are updated, so that the edit dates and times on the two devices match one another.

The external device 200 includes a program editing unit 31 and a file system unit 32. The program editing unit 31 is a tool for use in editing a machining program for a machine tool, by way of example. After the machining program editing is completed in the program editing unit 31, the file system unit 32 updates the edit date and time on the external storage device 300.

In a case where the machining program is edited by the external device 200, only the edit date and time on the external storage device 300 is updated. Consequently, the edit date and time on the external storage device 300 does not match the edit date and time on the file information storage unit 13.

The external storage device recognition unit 15 recognizes that the external storage device 300 is installed to the numerical controller 100. For example, the installation of the external storage device 300 is recognized when the numerical controller 100 is turned on. The presence of the external storage device 300 is checked during starting up the numerical controller 100, thereby recognizing the installation of the external storage device 300. The external storage device 300 may be installed with the numerical controller 100 operating. The external storage device 300 may be reconnected due to temporary disconnection caused by vibrations of a factory or so.

The program-to-be-run confirmation unit 16 updates a program to be run stored in the program-to-be-run storage unit 10 in response to the selection of a machining program to be run made by the operator. As a result of the update, file identification information about a machining program executed by the numerical controller 100 last time is stored in the program-to-be-run storage unit 10.

The file information reading unit 17 reads file identification information from the external storage device 300. In addition to that, the file information reading unit 17 acquires edit dates and times of machining programs stored in the external storage device 300 from the file system unit 11.

When there is a program to be run in the external storage device 300, the file information comparison unit 18 reads the edit date and time of the program to be run from the file information storage unit 13, and compares the edit date and time of the program to be run stored in the file information storage unit 13 with the edit date and time of the program to be run stored in the external storage device 300. When the edit date and time of the program to be run stored in the file information storage unit 13 differs from the edit date and time of the program to be run stored in the external storage device 300, it is determined that the program to be run is edited.

On the basis of the comparison result of the edit dates and times, the program-to-be-run selection unit 19 determines whether the machining program is edited or not. When the edit date and time of the machining program stored in the external storage device 300 is different from the edit data and time stored in the file information storage unit 13, it is determined that the machining program is edited.

If the edited machining program is rerun as it is, there is a possibility of performing processing which is not expected by the operator. The edit notification unit 20 notifies the operator that the machining program is edited. The notification can be made by displaying it on the numerical controller 100 or a handheld device of the operator, but it is not limited thereto.

The edit notification unit 20 may stop an automatic selection function for the program to be run. The edit notification unit 20 waits for an input from the operator with the automatic selection function for the program to be run being stopped. When the operator approves reuse of the program to be run, the processing may be started with a predefined program to be run. The edit notification unit 20 may display lists of machining programs stored in the external storage device 300 and the numerical controller 100 to accept a selection of a new machining program made by the operator.

The edit notification unit 20 may present edit date and time of an edited program to be run. For example, at least either one of the edit date and time on the file information storage unit 13 and the edit data and time on the external storage device 300 is displayed to aid the operator in determination.

The file information updating unit 14 updates the edit date and time of the program to be run stored in the file information storage unit 13 and the file identification information of the program to be run stored in the program-to-be-run storage unit 10.

The file information updating unit 14 updates the edit date and time on the file information storage unit 13 based on the edit date and time of the edited program to be run (1) when the operator selects the reuse of the edited program to be run. Consequently, the edit date and time on the external storage device 300 matches the edit date and time on the file information storage unit 13. The file information updating unit 14 updates the program-to-be-run storage unit 10 based on the file identification information about a newly selected program to be run (2) when the operator selects the change of the program to be run.

The numerical controller 100 of the illustrative disclosure determines whether file contents are changed based on the edit date and time of the program to be run, and when the file contents are changed, the automatic selection function for the machining program is stopped to avoid the unexpected processing from being started.

With reference to a flowchart of FIG. 3, a procedure of edit determination processing will be described, assuming that the machining program is provided with the file identification information.

When the numerical controller 100 is turned on (Step S1), the numerical controller 100 determines whether or not the external storage device 300 is installed thereto. When the external storage device 300 is installed (Step S2; Yes), the numerical controller 100 reads the file identification information about a program to be run (Step S3). When there is a program to be run in the numerical controller 100 (Step S4; No), the numerical controller 100 determines that the machining program is not edited and thereby goes into Step S8, and when the operation is continued (Step S8; Yes), waits for a new external storage device 300 to be attached.

When there is a machining program in the external storage device 300 (Step S4; Yes), the numerical controller 100 reads the edit date and time of the machining program from the external storage device 300. The numerical controller 100 in turn reads the edit date and time of the concerned machining program from the file information storage unit 13. The numerical controller 100 then compares the edit date and time of the program to be run stored in the external storage device 300 with the edit date and time of the program to be run stored in the file information storage unit 13 (Step S5).

When the edit date and time stored in the external storage device 300 differs from the edit date and time stored in the file information storage unit 13 (Step S6; Yes), the numerical controller 100 determines that the machining program is edited, and notifies the operator about it (Step S7). Then, the operator determines whether to reselect the edited program to be run or select another machining program.

When the edit date and time stored in the external storage device 300 matches the edit date and time stored in the file information storage unit 13 (Step S6; No), the numerical controller 100 determines that the program to be run is not edited. The numerical controller 100 then starts the processing by using the concerned program to be run.

When the operation is continued with the numerical controller 100 being turned on (Step S8; Yes), the numerical controller 100 goes to Step S2 to monitor the installation of the external storage device 300. When the operation of the numerical controller 100 is terminated (Step S8; No), the numerical controller 100 ends the processing.

Figure 4:
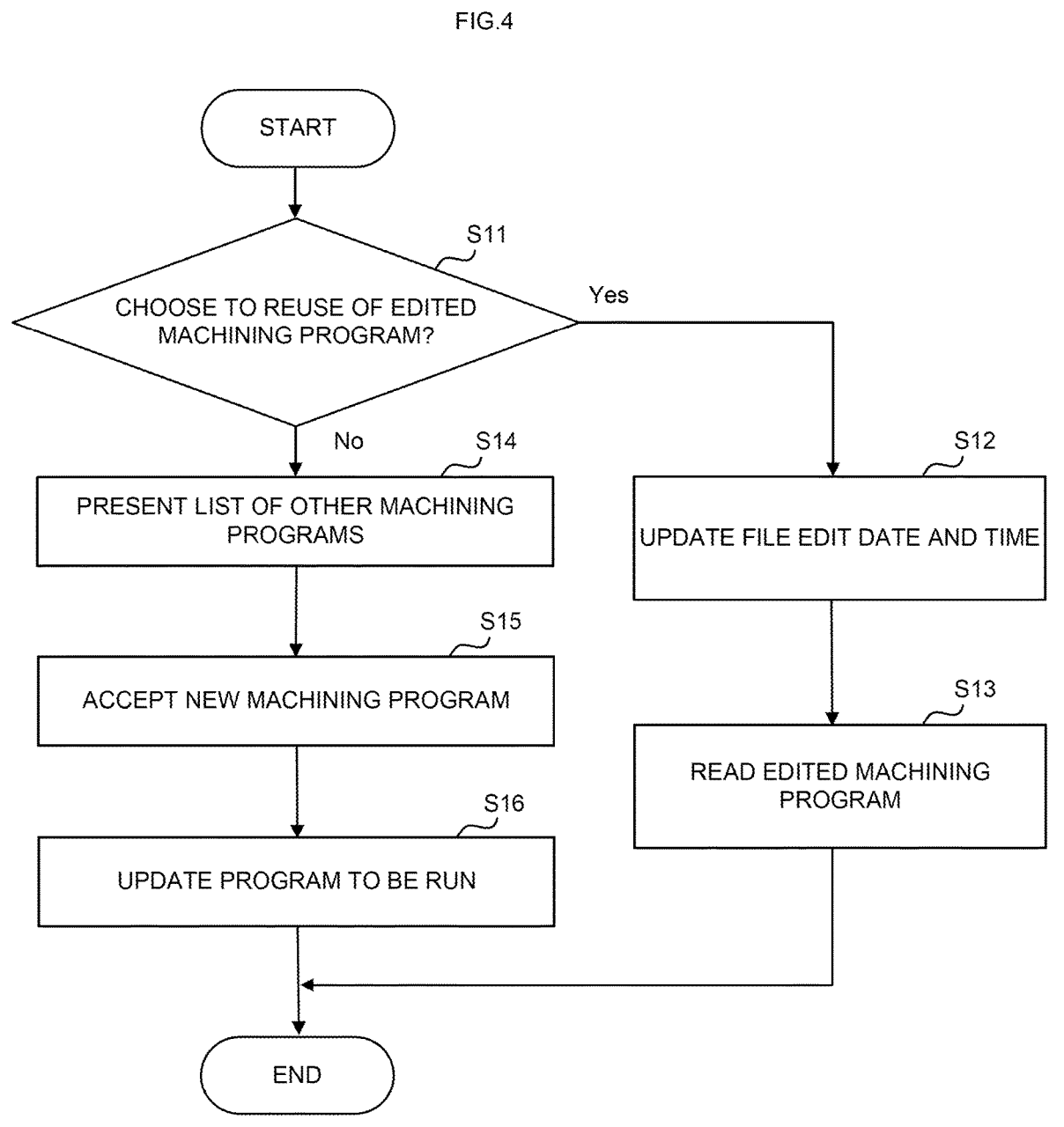

Next, a description will be made about a process of updating the edit date and time and the program to be run by referring to FIG. 4.

When the numerical controller 100 notifies the operator that the program to be run is edited and the operator in turn selects the reuse of the edited program to be run (Step S11; Yes), the numerical controller 100 reads the edit date and time of the edited machining program from the external storage device 300 to update the edit date and time on the file information storage unit 13 (Step S12). The numerical controller 100 reads the edited program to be run from the external storage device 300 (Step S13) to use it again.

When the operator does not select the reuse of the edited machining program (Step S11; No), the numerical controller 100 provides the operator with the list of the other machining programs (Step S14). The numerical controller 100 then accepts the selection of a new machining program (Step S15), and updates the selected machining program to the program to be run (Step S16).

As described above, when it is determined that the machining program is edited, the numerical controller 100 of the illustrative disclosure allows the operator to choose to reuse the edited machining program or use another machining program. When the operator chooses to reuse the edited program, the numerical controller 100 updates the edit date and time on the file information storage unit based on the edit date and time of the external storage device.

When the use of another machining program is selected, the selected machining program is set as a program to be run. When another machining program is selected as the program to be run, a determination may be made about whether the selected machining program is edited or not.

SECOND DISCLOSURE

FIG. 5 shows a file management system 1000 according to a second disclosure. In the file management system 1000 of the second disclosure, the update of the edit date and time is conducted by the edit date and time updating unit 23, instead of the file system unit 11. In the second disclosure, the external device 200 includes a program editing unit 31 and an edit date and time updating unit 33.

The edit date and time updating unit 33 updates the edit date and time of the machining program stored in the external storage device 300. In the case of editing the machining program by the external device 200, the edit date and time on the file information storage unit 13 is not updated, causing mismatch between the edit date and time of the machining program stored in the external storage device 300 and the edit date and time of the machining program stored in the file information storage unit 13.

In a case where the numerical controller 100 edits the machining program stored in the external storage device 300, the edit date and time updating unit 23 of the numerical controller 100 updates not only the edit date and time of the machining program stored in the external storage device 300 but also the edit date and time on the file information storage unit 13. In the case where the numerical controller 100 edits the machining program, the edit date and time on the external storage device 300 matches the edit date and time on the file information storage unit 13.

When the installation of the external storage device 300 is recognized, the file information reading unit 17 reads the edit date and time as well as the file identification information of the program to be run from the external storage device 300.

When a machining program having the same file identification information as that of the program to be run is stored in the external storage device 300, the file information comparison unit 18 compares the edit date and time of the program to be run read from the external storage device 300 with the edit date and time of the program to be run stored in the file information storage unit 13. If the edit dates and times of the two devices are different, it is determined that the program to be run is edited.

The program-to-be-run selection unit 19 notifies the operator that the machining program is edited. The operator then chooses the edited machining program again or chooses another machining program as a program to be run. In a case where the edited machining program is selected again, the file information updating unit 14 updates the edit date and time on the file information storage unit 13 with the edit date and time read from the external storage device 300.

In the file management system 1000 of the second disclosure, the management of the edit dates and times is conducted by the edit date and time updating unit 23 of the numerical controller 100 and the edit date and time updating unit 33 of the external device 200, instead of the file system unit 11.

Figure 6:
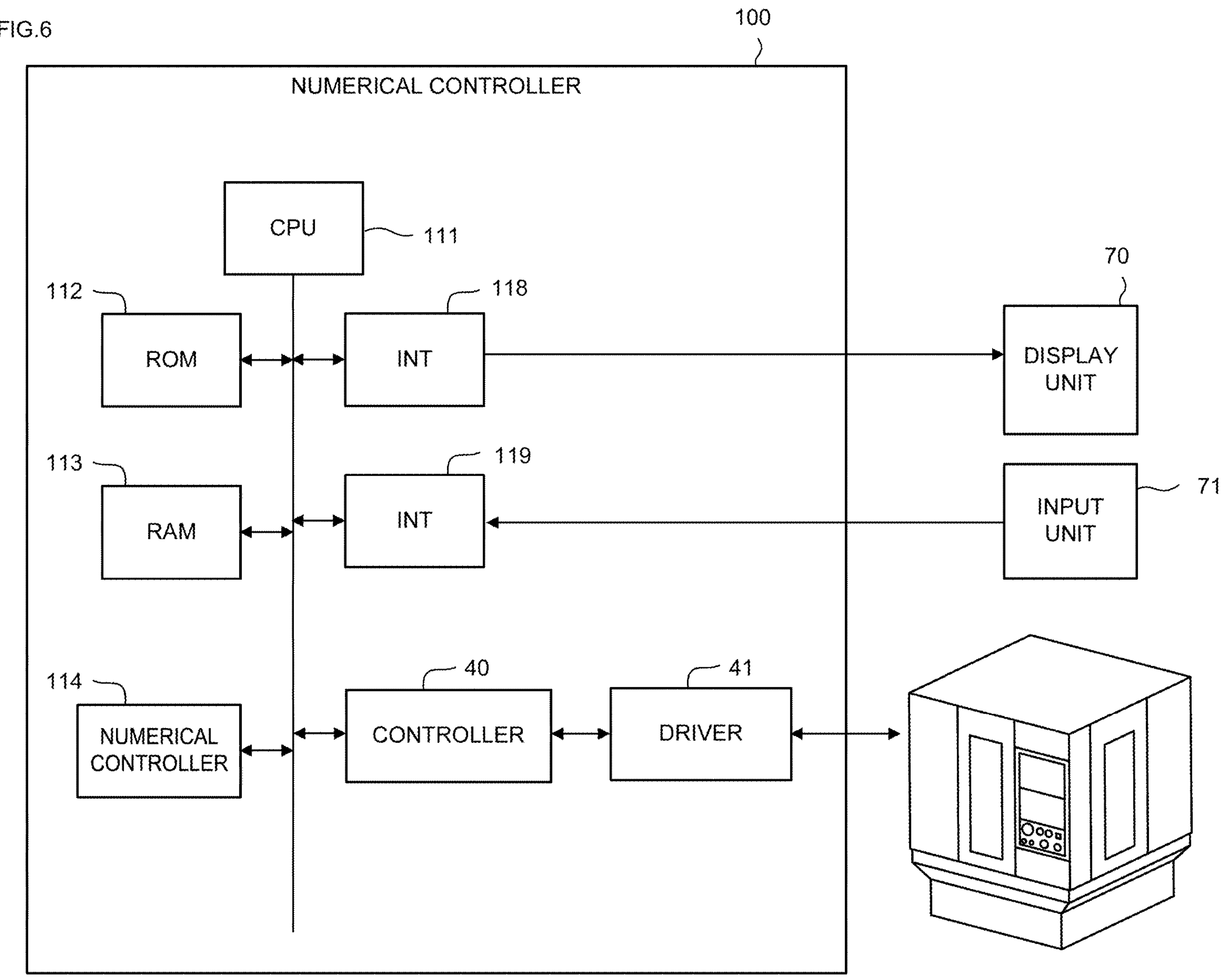
FIG. 6 is a hardware configuration diagram of a numerical controller.

With reference to FIG. 6, a description will be made about a hardware configuration of the numerical controller 100 for controlling a machine tool. The numerical controller 100 includes a central processing unit (CPU) 111 that is a processor for controlling the entire numerical controller 100. The CPU 111 is configured to read a system program processed by a read-only memory (ROM) 112 through a bus to thereby control the entire numerical controller 100 in accordance with the system program. A random-access memory (RAM) 113 is configured to temporarily store temporary computation data and pieces of data to be displayed, as well as various pieces of data input by a user through an input unit 71.

A display unit 70 is a monitor or similar that is attached to the numerical controller 100. The display unit 70 is configured to display an operation screen, a setting screen and others of the numerical controller 100.

The input unit 71 is a keyboard, touch panel or similar that is integral with or separate from the display unit 70. The user operates the input unit 71 to input data to a screen displayed by the display unit 70, for instance. The display unit 70 and the input unit 71 may be handheld devices.

A non-volatile memory 114 is, for instance, a memory that is backed up by a battery, not shown, so that a state of storage is retained even when a power source of the numerical controller 100 is turned off. The non-volatile memory 114 is configured to store programs read from an external device via an interface, not shown, programs input through the input device 71, and various data acquired from the units of the numerical controller 100, a machine tool and others (e.g., setting parameters acquired from the machine tool). The programs and the various data stored in the non-volatile memory 114 may be deployed into the RAM 113 when they are executed/used. Furthermore, the ROM 112 is configured to store beforehand various system programs.

A controller 40 that controls tools of the machine tool is configured to convert an axis moving command from the CPU 111 into a pulse signal, and output the pulse signal to a driver 41. The driver 41 is configured to convert the pulse signal into a current to drive a servomotor of the machine tool. The servomotor is configured to move the tools and tables under the control by the numerical controller 100.

As described above, in the file management system 1000 according to the illustrative disclosure, the edit date and time of the machining program is stored in the file information storage unit 13 of the numerical controller 100 and the external storage device 300. In the case where the machining program in the external storage device 300 is edited in the numerical controller 100, the numerical controller 100 updates both of the edit date and time of the machining program stored in the file information storage unit 13 and the edit date and time of the machining program stored in the external storage device 300, so that the two edit dates and times match one another.

In the case where the external device 200 edits the machining program stored in the external storage device 300, only the edit date and time of the external storage device 300 is updated. Consequently, the edit date and time of the machining program stored in the external device 200 does not match the edit date and time of the machining program stored in the file information storage unit 13.

The file information comparison unit 18 of the numerical controller 100 compares the edit date and time on the external storage device 300 with the edit date and time on the file information storage unit 13, and when there is a difference between the two edit dates and times, then determines that the program to be run is edited. The file management system of the illustrative disclosure can use the edit date and time to identify whether the file contents are changed.

The reading and updating of the edit date and time are conducted by the file system unit in the first disclosure and by the file information reading unit in the second disclosure.

REFERENCE SIGNS LIST

100 Numerical controller
10 Program-To-Be-Run Storage Unit
11 File System Unit
12 File Identification Management Unit
13 File Information Storage Unit
14 File Information Updating Unit
15 External Device Recognition Unit
16 Program-To-Be-Run Confirmation Unit
17 File Information Reading Unit
18 File Information Comparison Unit
19 Program-To-Be-Run Selection Unit
20 Edit Notification Unit
21 Editing Device
22 Program Editing Unit
23 Edit Date and Time Updating Unit
111 CPU
112 ROM
113 RAM
114 Non-Volatile Memory

The invention claimed is:

1. A numerical controller, comprising:

a file information storage unit that stores file identification information and an edit date and time of a machining program;

a program-to-be-run storage unit that stores file identification information of a program to be run which is a machining program set to be run;

an external storage device recognition unit that recognizes an installation of an external storage device; and a file information comparison unit that determines that the program to be run is edited when, in a case where the program to be run is stored in the installed external storage device and the program to be run is automatically selected as a machining program, an edit date and time of the program to be run stored in the external storage device differs from an edit date and time of a program to be run stored in the file information storage unit.

2. The numerical controller according to claim 1, comprising a file identification information management unit that adds unique file identification information to each machining program with respect to a file in which the machining program is stored.

3. The numerical controller according to claim 1, comprising:

an editing unit that edits the machining program;

a file system unit that updates the edit date and time of the machining program stored in the external storage device when the machining program stored in the external storage device is edited; and an edit date and time updating unit that updates the edit date and time of the machining program stored in the file information storage unit.

4. The numerical controller according to claim 1, comprising:

an editing unit that edits the machining program; and an edit date and time updating unit that updates the edit date and time of the machining program stored in the external storage device and the edit date and time of the machining program stored in the file information storage unit when the machining program stored in the external storage device is edited.

5. The numerical controller according to claim 1, comprising a program to-be-run selection unit that selects the program to be run as a machining program to be run when it is determined that the program to be run is not edited.

6. The numerical controller according to claim 1, comprising an edit notification unit that notifies an operator that the program to be run is edited when it is determined that the program to be run is edited.

7. The numerical controller according to claim 6, wherein the edit notification unit holds off on starting processing until the operator approves it.

8. The numerical controller according to claim 1, wherein the program to be run is a machining program that was executed by the numerical controller last time.

9. A non-transitory storage medium for storing a computer-readable command that is executed by one or more processors to perform:

storing file identification information and an edit date and time of a machining program in a numerical controller;

storing file identification information of a program to be run in the numerical controller, the program being a machining program set to be run;

recognizing an installation of an external storage device to the numerical controller; and when, in a case where the program to be run is stored in the installed external storage device and the program to be run is automatically selected as a machining program, determining that the program to be run is edited when there is a difference between an edit date and time of a program to be run stored in the external storage device and an edit date and time of a program to be run stored in the numerical controller.

* * * * *